(12) United States Patent
Kim

(10) Patent No.: US 7,371,343 B2
(45) Date of Patent: May 13, 2008

(54) NANO-POWDER EXTRACTION APPARATUS USING A HOLLOW IMPELLER

(75) Inventor: Young-Nam Kim, Daejeon (KR)

(73) Assignee: Nano Plasma Center Co., Ltd. (KR)

( * ) Notice: Subject to any disclaimer, the term of this patent is extended or adjusted under 35 U.S.C. 154(b) by 493 days.

(21) Appl. No.: 10/503,752

(22) PCT Filed: Feb. 25, 2003

(86) PCT No.: PCT/KR03/00374

§ 371 (c)(1),
(2), (4) Date: Aug. 5, 2004

(87) PCT Pub. No.: WO03/070626

PCT Pub. Date: Aug. 28, 2003

(65) Prior Publication Data

US 2005/0077659 A1    Apr. 14, 2005

(30) Foreign Application Priority Data

Feb. 25, 2002    (KR) .................... 10-2002-0009809

(51) Int. Cl.
*B22F 9/04* (2006.01)
(52) U.S. Cl. ..................... 266/168; 266/216
(58) Field of Classification Search ............. 266/168
See application file for complete search history.

(56) References Cited

U.S. PATENT DOCUMENTS 6,106,588 A * 8/2000 Skibo et al. ............ 266/216

FOREIGN PATENT DOCUMENTS

| EP | 1 039 288 A2 | 9/2000 |
|---|---|---|
| JP | 1-194733 | 8/1989 |
| JP | 7-760 | 1/1995 |
| KR | 2000-0000090 | 1/2000 |

OTHER PUBLICATIONS

PCT International Search Report; International application No. PCT/KR03/00374; International filing date: Feb. 25, 2003; Date of Mailing: Jun. 19, 2003.
PCT International Preliminary Examination Report; International application No. PCT/KR2003/000374; International filing date: Feb. 25, 2003; Date of Completion: Jun. 17, 2004.

* cited by examiner

*Primary Examiner*—Scott Kastler
(74) *Attorney, Agent, or Firm*—Cantor Colburn LLP

(57) ABSTRACT

Disclosed herein is a nano-powder extraction apparatus using the rotation of a hollow impeller, which is configured to extract nano-powder according to particle size thereof by effectively dissolving the nano-powder contained in plasma gas into a surfactant solution, and to prevent the aggregation of nano-powder as the nano-powder is absorbed in and collected by a surfactant of solution, thereby enabling the application of strongly reactive materials.

12 Claims, 4 Drawing Sheets

NANO-POWDER EXTRACTION APPARATUS USING A HOLLOW IMPELLER

TECHNICAL FIELD

The present invention relates generally to a nano-powder extraction apparatus using hollow impellers, and more particularly to a nano-powder extraction apparatus for extracting nano-powder using plasma by the rotation of hollow impellers, which is configured to extract the nano-powder contained in plasma gas according to particle size thereof.

BACKGROUND ART

Generally, in the production of nano-powder using plasma, two representative extraction methods have been employed. The first method extracts the nano-powder using a filter, and the second method extracts the nano-powder by scraping the nano-powder attached to the walls of a cryogenic container.

The conventional methods as stated above, however, have a problem that it is unable to separate the nano-powder according to particle size thereof.

Another shortcoming of the conventional methods is that only non-reactive oxide-based materials (for example, alumina and so on) are applicable due to a hazard inherent in explosive reaction between colliding nano-powder particles.

DISCLOSURE OF THE INVENTION

Therefore, the present invention has been made in view of the above problems, and it is an object of the present invention to provide a nano-powder extraction apparatus using the rotation of hollow impellers, which is configured to extract nano-powder according to particle size thereof by effectively dissolving the nano-powder contained in plasma gas into a surfactant solution.

It is another object of the present invention to provide a nano-powder extraction apparatus which is configured to prevent the aggregation of nano-powder as the nano-powder is absorbed in and collected by a surfactant solution, thereby enabling the application of strongly reactive materials as well as non-reactive materials.

It is a further object of the present invention to provide a nano-powder extraction apparatus having upper and lower water circulating chambers installed around a tank for adjusting the interior temperature of the tank, the chambers carrying out heat transfer with the interior space of the tank, thereby increasing the separation of nano-powder according to particle size thereof.

It is yet another object of the present invention to provide a nano-powder extraction apparatus having a gas regenerating device installed at a tank for regenerating undissolved gas into cryogenic gas after collecting it and then re-supplying the cryogenic gas into the tank, thereby preventing the explosion of residual strongly reactive nano-powder existing in small quantities in the undissolved gas.

In accordance with the present invention, the above and other objects can be accomplished by the provision of a nano-powder extraction apparatus using the rotation of hollow impellers comprising: a collecting device having a tank charged with a surfactant solution, the tank being provided at its side wall with a plurality of powder extraction pipes installed at different heights, and solution inlet and outlet ports; and a gas supply device mounted inside the tank and adapted to supply gas containing nano-powder into the solution charged in the tank so that the gas is swirled and uniformly distributed into the solution, the gas supply device having a rotatable drive shaft penetrating vertically through the tank, the rotatable drive shaft being formed at its lower portion with a gas supply hollow bore connected at its lower end to a gas injection device for receiving the gas therefrom, the gas supply device also having at least one supply impeller horizontally mounted around the rotatable drive shaft at an upper end of the gas supply hollow bore, the supply impeller being formed with a plurality of hollow diffusion holes communicating with the gas supply hollow bore.

BRIEF DESCRIPTION OF THE DRAWINGS

The above and other objects, features and other advantages of the present invention will be more clearly understood from the following detailed description taken in conjunction with the accompanying drawings, in which.

BEST MODE FOR CARRYING OUT THE INVENTION

Figure 1:
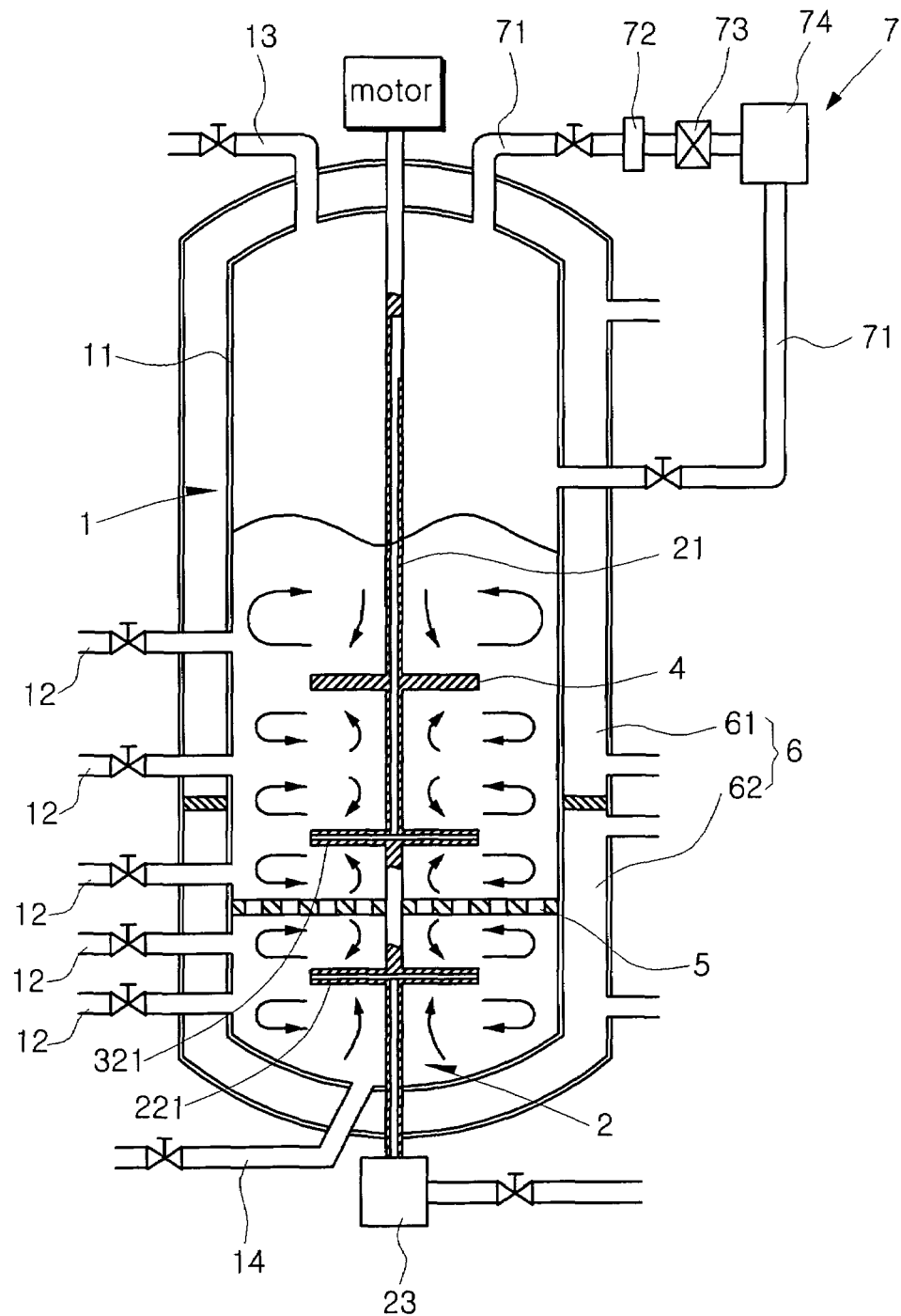
FIG. 1 is a schematic view illustrating an extraction apparatus of the present invention.
Figure 2:
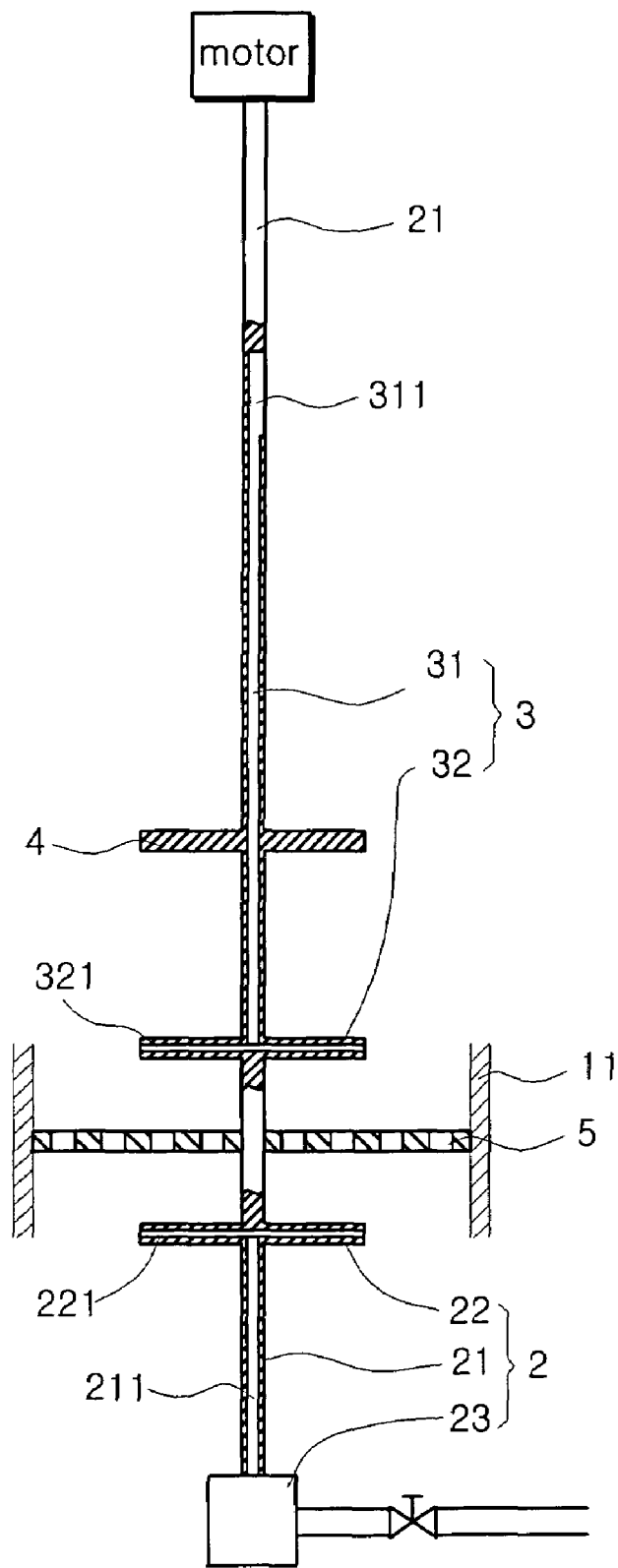
FIG. 2 is an enlarged view illustrating a rotatable drive shaft of the present invention.
Figure 3:
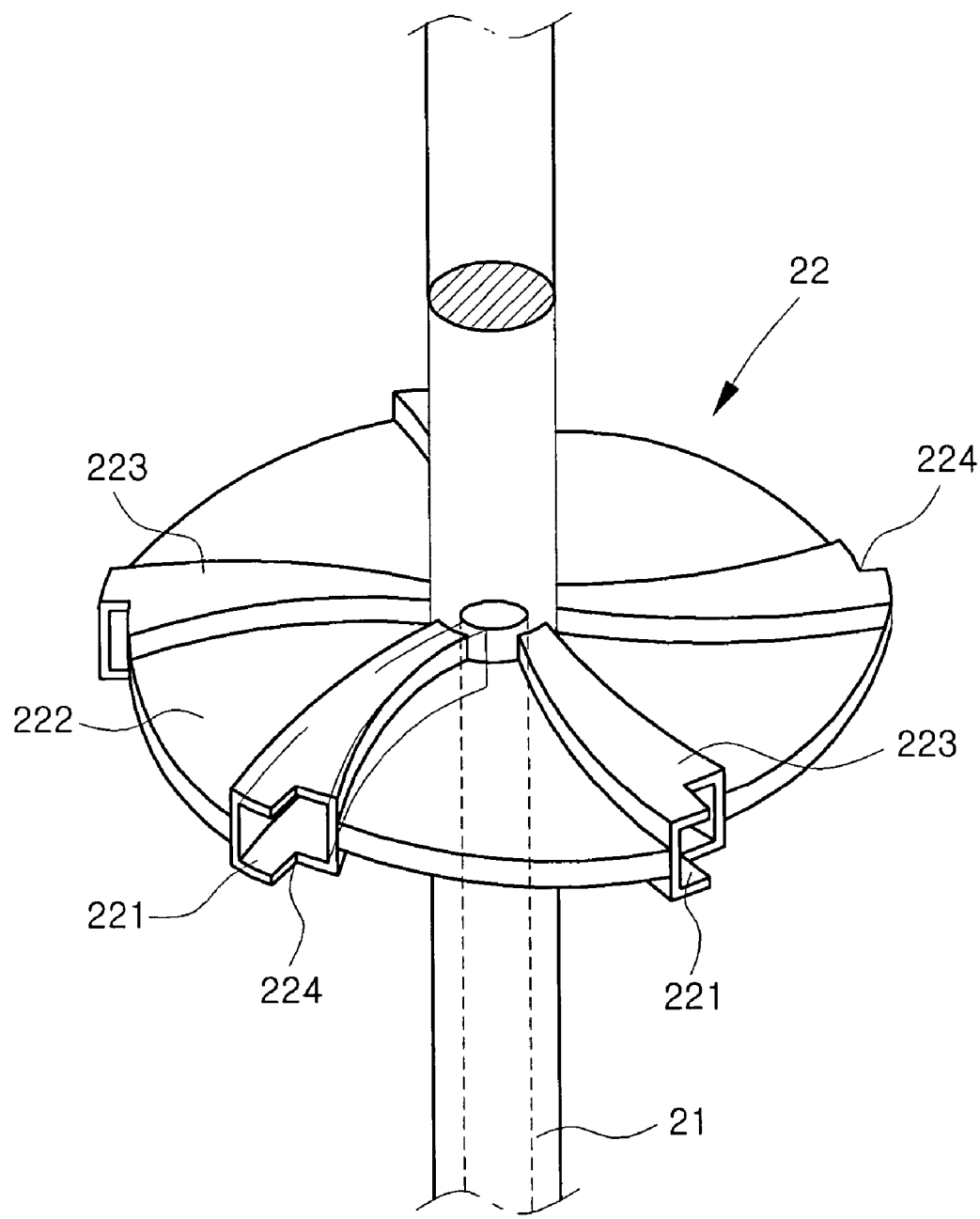
FIGS. 3 and 4 are perspective views illustrating supply and withdrawal impellers in accordance with the present invention, respectively.
Figure 4:
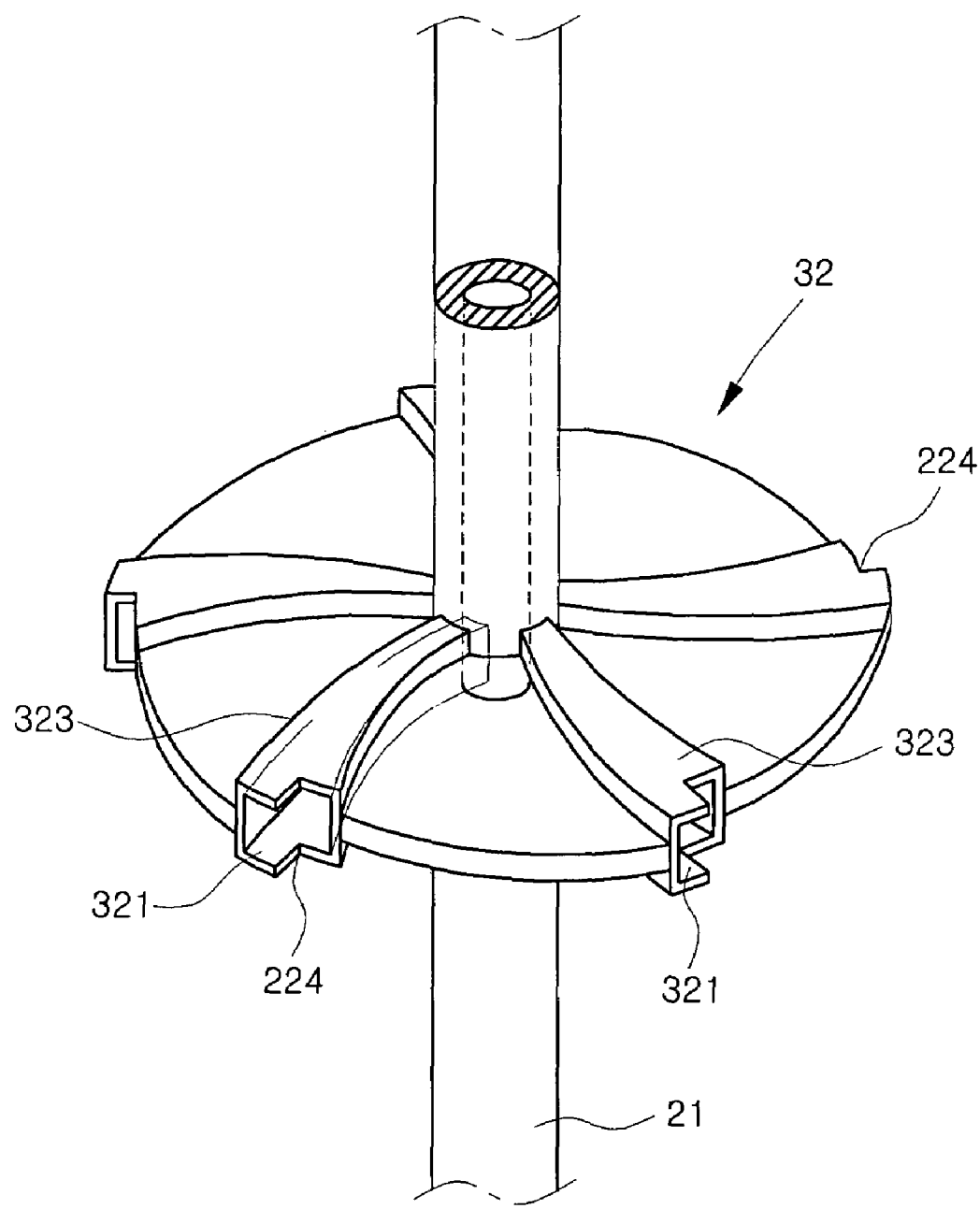

FIG. 1 is a schematic view illustrating an extraction apparatus of the present invention, and FIG. 2 is an enlarged view illustrating a rotatable drive shaft of the present invention.

An extraction apparatus of the present invention generally comprises a collecting device 1, and a gas supply device 2. The collecting device 1 includes a tank 11 charged with surfactant solution (hereinafter referred to as "solution" for ease of description). The tank 11 is provided with a plurality of powder extraction pipes 12 and solution inlet and outlet ports 13 and 14, each of the pipes and ports having respective valves. The extraction pipes 12 are arranged along the side wall of the tank 11 at different heights to extract nano-powder according to particle size thereof. The gas supply device 2 is adapted to supply plasma gas (hereinafter referred to as "gas" for ease of description) containing the nano-powder into the solution charged in the tank 11 so that the gas is uniformly distributed into the solution.

The gas supply device 2 includes a rotatable drive shaft 21, at least one supply impeller 22, and a gas injection device 23. The rotatable drive shaft 21 extends vertically inside the tank 11 to penetrate it. The rotatable drive shaft 21 has a gas supply hollow bore 211 extending vertically at the lower portion thereof. The gas supply hollow bore 211 is connected at its lower end to the gas injection device 23 for receiving the gas therefrom. The supply impeller 22 is horizontally mounted around the rotatable drive shaft 21 at the upper end of the gas supply hollow bore 211. The supply impeller 22 is formed with a plurality of hollow diffusion holes 221 communicating with the gas supply hollow bore 211 of the rotatable drive shaft 21.

The rotatable drive shaft 21 is adapted to be driven by a drive motor mounted at the outside and adjacent to the upper end of the tank 11.

In a state of rotating the rotatable drive shaft 21 using the drive motor, as the gas is supplied into the gas supply hollow bore 211 of the rotatable drive shaft 21 through the gas injection device 23, the supplied gas having passed through the gas supply hollow bore 211 is centrifugally dispersed in all directions while passing the hollow diffusion holes 221 formed at the supply impeller 22.

During the rotation of the supply impeller 22, the gas supply hollow bore 211 formed in the rotatable drive shaft 21 is in a negative pressure state. This negative pressure of the gas supply hollow bore 211 causes the gas to be easily sucked into the supply impeller 22, thereby increasing the discharge pressure of the hollow diffusion holes 221. As a result, the dispersion degree of the gas is maximized.

As the gas is effectively dispersed in all directions by the rotation of the supply impeller 22 as stated above, the nano-powder contained in the gas can be rapidly dissolved into the surfactant solution charged in the tank 11 without the aggregation of the nano-powder. Also, in this state, the nano-powder particles are surrounded by a surfactant of the solution. Thus, during collection, the explosion of strongly reactive nano-powder is prevented.

As the supply impeller 22 is rotated, the supply impeller 22 generates fluid currents at upper and lower sides thereof. Due to these fluid currents, the nano-powder having a large particle size sinks to the lower side of the supply impeller 22 by its weight, and the nano-powder having a small particle size rises to the upper side of the impeller 22. Thus, the nano-powder is extracted according to particle size thereof using the powder extraction pipes 12 stepwisely arranged at different heights along the side wall of the tank 11. Particularly, the specific nano-powder having a vary large particle size is extracted through the outlet port 14 formed at the bottom of the tank 11.

As shown in FIGS. 1 and 2, the extraction apparatus further comprises a gas withdrawal device 3 installed to the rotatable drive shaft 21 extending vertically through the tank 11. The gas withdrawal device 3 is provided with a gas withdrawal hollow bore 31, and at least one withdrawal impeller 32. The gas withdrawal hollow bore 31 extends vertically in the rotatable drive shaft 21 from its middle portion to its upper portion, and has a withdrawal opening 311 formed at the rotatable drive shaft 21 adjacent at its upper end. The withdrawal impeller 32 is horizontally mounted around the rotatable drive shaft 21 at the lower end of the gas withdrawal hollow bore 31. The withdrawal impeller 32 is formed with a plurality of hollow diffusion holes 321 communicating with the gas withdrawal hollow bore 31.

According to the gas withdrawal device 3, the undissolved gas risen above the solution flows into the withdrawal opening 311 formed at the upper portion of the rotatable drive shaft 21. Then, the inflow gas is repeatedly diffused and dissolved into the solution through the withdrawal impeller 32. In this way, the solubility of the gas is increased and consequently the extraction efficiency of the nano-powder is increased.

FIGS. 3 and 4 are perspective views illustrating the supply and withdrawal impellers in accordance with the present invention.

As shown in FIGS. 3 and 4, the supply impeller 22 and withdrawal impeller 32 comprise circular plates 222 and 322 fixed to the rotatable drive shaft 21, respectively. In addition, the supply impeller 22 and withdrawal impeller 32 are provided with a plurality of arc-shaped projection blades 223 and 323, respectively, which are integrally formed onto the upper and lower surface of the respective circular plates 222 and 322 while being radially arranged with equal spacing. The respective arc-shaped projection blades 223 and 323 define the respective diffusion hollow holes 221 and 321 therein.

As the arc-shaped projection blades 223 and 323, extending upwardly and downwardly from the circular plates 222 and 322, are adapted to diffuse the solution horizontally, the supply and withdrawal impellers 22 and 32 causes several fluid currents to be produced therebetween. The production of fluid currents further increases the separation of the nano-powder.

Moreover, as the arc-shaped projection blades 223 and 323 extend upwardly and downwardly from the circular plates 222 and 322, the arc-shaped projection blades 223 and 323 produce a relatively large resistance to the flow of solution. This deepen the boundaries of the fluid currents, thereby the mixing of different nano-powders having different particle sizes being effectively prevented. Also, these fluid currents amplify the swirling motion of the solution, thereby maximizing the mixing degree between the solution and gas.

The arc-shaped projection blades 223 and 323 are formed at their outer ends with flow-resisting recesses 224 and 324, respectively, for increasing the swirling motion of the solution. By virtue of these flow-resisting recesses 224 and 324, the mixing degree between the solution and gas is more increased.

As shown in FIGS. 1 and 2, the extraction apparatus further comprises at least one impeller 4 horizontally mounted to the rotatable drive shaft 21 above the withdrawal impeller 32. The impeller 4 enables the separation of nano-powder having a micro-scale particle size.

The extraction apparatus further comprises a horizontal perforated plate 5 fixed between the supply impeller 22 and withdrawal impeller 32 in the tank 11 to sectionalize the interior space of the tank 11. The horizontal perforated plate 5 is formed with a plurality of holes and adapted to prevent the rapid upward movement of the nano-powder. Also, the horizontal perforated plate 5 is adapted to prevent the upward movement of the nano-powder having a very large particle size located thereunder.

As shown in FIG. 1, the nano-powder extraction apparatus further comprises a temperature adjustment device 6 installed around the upper and lower portions of the tank 11 in order to adjust the interior temperature of the tank 11. The temperature adjustment device 6 has upper and lower water circulating chambers 61 and 62, which are adapted to carry out heat transfer with the interior space of the tank, thereby increasing the separation of nano-powder, in addition to the separation due to the fluid currents.

At the early stage of gas injection, the upper and lower water circulating chambers 61 and 62 have the same temperature as each other. This state prevents the aggregation of the nano-powder, thereby preventing the explosion of the nano-powder and completing the extraction of the nano-powder. Specifically, where the temperature of the upper water circulating chamber 61 is lowered rapidly, the separation of the nano-powder due to the heat transfer is increased.

The nano-powder extraction apparatus further comprises a gas regenerating device 7 at the upper side of the tank 11. The gas regenerating device 7 serves to regenerate undissolved risen gas into cryogenic gas after collecting it and then re-supply the cryogenic gas into the tank 11. The gas regenerating device 7 has a circulation pipe 71, which extends between the top wall section of the tank 11 and a certain upper position of the side wall of the tank 11, and is mounted with a valve. The circulation pipe 71 is additionally provided with a filter 72, a liquid separator 73, and a gas regenerator 74 in turn.

According to the configuration of the gas regenerating device 7 as stated above, residual nano-powder existing in small quantities in the undissolved gas is collected by the filter 72, and a small quantity of vaporized solution component contained in the gas is removed by the liquid separator 73. Then, the dissolved gas is regenerated into cryogenic gas while passing through the gas regenerator 74.

Finally, as the regenerated cryogenic gas is re-supplied into the upper space of the tank 11 above the solution through the circulation pipe 71, the residual strongly reactive nano-powder existing in small quantities in the undissolved gas can be stably collected without explosion.

INDUSTRIAL APPLICABILITY

As apparent from the above description, the present invention provides a nano-powder extraction apparatus which is configured to extract nano-powder according to particle size thereof by effectively dissolving the nano-powder contained in gas into a surfactant solution, thereby achieving various purposes of different nano-powders.

Because of the nano-powder is surrounded and absorbed by the surfactant solution, it is possible to secure a desired safety in the collection of strongly reactive materials.

Further, according to the present invention, the nano-powder extraction apparatus comprises upper and lower water circulating chambers installed around a tank for adjusting the interior temperature of the tank, and the chambers are adapted to carry out heat transfer with the interior space of the tank. Due to this heat transfer, it is possible to increase the separation of nano-powder according to particle size thereof and also increase the extraction amount of the nano-powder.

Furthermore, the nano-powder extraction apparatus according to the present invention is configured to regenerate undissolved risen gas into cryogenic gas and then re-supply the cryogenic gas into the tank, thereby effectively preventing the explosion of residual strongly reactive nano-powder existing in small quantities in the undissolved gas.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A nano-powder extraction apparatus by the rotation of hollow impellers comprising:

a collecting device having a tank charged with a surfactant solution, the tank being provided at its side wall with a plurality of powder extraction pipes installed at different heights, and with solution inlet and outlet ports; and a gas supply device mounted inside the tank and adapted to supply gas containing nano-powder into the solution charged in the tank so that the gas is swirled and uniformly distributed into the solution, the gas supply device having a rotatable drive shaft penetrating vertically through the tank, the rotatable drive shaft being formed at its lower portion with a gas supply hollow bore connected at its lower end to a gas injection device for receiving the gas therefrom, the gas supply device also having at least one supply impeller horizontally mounted around the rotatable drive shaft at an upper end of the gas supply hollow bore, the supply impeller being formed with a plurality of hollow diffusion holes communicating with the gas supply hollow bore, wherein the supply impeller comprises a circular plate fixed to the rotatable drive shaft, and a plurality of arc-shaped projection blades extending upwardly and downwardly from upper and lower surfaces of the circular plate while being radially arranged with equal spacing, each arc-shaped projection blade defines a diffusion hollow hole therein.

2. The nano-powder extraction apparatus as set forth in claim 1, wherein the respective arc-shaped projection blades are formed at their outer ends with flow-resisting recesses, respectively, for increasing the swirling motion of the solution.

3. A nano-powder extraction apparatus by the rotation of hollow impellers comprising:

a collecting device having a tank charged with a surfactant solution, the tank being provided at its side wall with a plurality of powder extraction pipes installed at different heights, and with solution inlet and outlet ports; and a gas supply device mounted inside the tank and adapted to supply gas containing nano-powder into the solution charged in the tank so that the gas is swirled and uniformly distributed, into the solution, the gas supply device having a rotatable drive shaft penetrating vertically through the tank, the rotatable drive shaft being formed at its lower portion with a gas supply hollow bore connected at its lower end to a gas injection device for receiving the gas therefrom, the gas supply device also having at least one supply impeller horizontally mounted around the rotatable drive shaft at an upper end of the gas supply hollow bore, the supply impeller being formed with a plurality of hollow diffusion holes communicating with the gas supply hollow bore; and a temperature adjustment device formed around upper and lower portions of the tank in order to adjust the interior temperature of the tank, the device having upper and lower water circulating chambers.

4. A nano-powder extraction apparatus by the rotation of hollow impellers comprising:

a collecting device having a tank charged with a surfactant solution, the tank being provided at its side wall with a plurality of powder extraction pipes installed at different heights, and with solution inlet and outlet ports; and a gas supply device mounted inside the tank and adapted to supply gas containing nano-powder into the solution charged in the tank so that the gas is swirled and uniformly distributed into the solution, the gas supply device having a rotatable drive shaft penetrating vertically through the tank, the rotatable drive shaft being formed at its lower portion with a gas supply hollow bore connected at its lower end to a gas injection device for receiving the gas therefrom, the gas supply device also having at least one supply impeller horizontally mounted around the rotatable drive shaft at an upper end of the gas supply hollow bore, the supply impeller being formed with a plurality of hollow diffusion holes communicating with the gas supply hollow bore; and a gas regenerating device provided at an upper side of the tank and adapted to regenerate undissolved risen gas into cryogenic gas and then re-supply the cryogenic gas into the tank, the gas regenerating device having a circulation pipe extending between a top wall section of the tank and an upper position of the side wall of the tank and mounted with a valve, the gas regenerating device also having a filter, a liquid separator, and a gas regenerator successively mounted to the circulation pipe.

5. The nano-powder extraction apparatus as set forth in claim 1, further comprising:
- a gas withdrawal device installed to the rotatable drive shaft,
- the gas withdrawal device having:
- a gas withdrawal hollow bore extending vertically in the rotatable drive shaft from its middle portion to its upper portion, and being formed with a withdrawal opening at its upper end; and
- a withdrawal impeller horizontally mounted around the rotatable drive shaft at the lower end of the gas withdrawal hollow bore, and being formed with a plurality of hollow diffusion holes communicating with the gas withdrawal hollow bore.

6. The nano-powder extraction apparatus as set forth in claim 5, wherein the withdrawal impeller comprises a circular plate fixed to the rotatable drive shaft, and a plurality of arc-shaped projection blades extending upwardly and downwardly from upper and lower surfaces of the circular plate while being radially arranged with equal spacing, each arc-shaped projection blade defines a diffusion hollow hole therein.

7. The nano-powder extraction apparatus as set forth in claim 6, wherein the respective arc-shaped projection blades are formed at their outer ends with flow-resisting recesses, respectively, for increasing the swirling motion of the solution.

8. The nano-powder extraction apparatus as set forth in claim 6, further comprising:
- at least one impeller horizontally mounted to the rotatable drive shaft above the withdrawal impeller.

9. The nano-powder extraction apparatus as set forth in claim 5, further comprising:
- a horizontal perforated plate fixed between the supply impeller and withdrawal impellers in the tank to sectionalize the interior space of the tank, and adapted to prevent the rapid upward movement of the nano-powder, the plate being formed with a plurality of holes.

10. The nano-powder extraction apparatus as set forth in claim 2, further comprising:
- a gas withdrawal device installed to the rotatable drive shaft,
- the gas withdrawal device having:
- a gas withdrawal hollow bore extending vertically in the rotatable drive shaft from its middle portion to its upper portion, and being formed with a withdrawal opening at its upper end; and
- a withdrawal impeller horizontally mounted around the rotatable drive shaft at the lower end of the gas withdrawal hollow bore, and being formed with a plurality of hollow diffusion holes communicating with the gas withdrawal hollow bore.

11. The nano-powder extraction apparatus as set forth in claim 3, further comprising:
- a gas withdrawal device installed to the rotatable drive shaft, the gas withdrawal device having:

a gas withdrawal hollow bore extending vertically in the rotatable drive shaft from its middle portion to its upper portion, and being formed with a withdrawal opening at its upper end; and a withdrawal impeller horizontally mounted around the rotatable drive shaft at the lower end of the gas withdrawal hollow bore, and being formed with a plurality of hollow diffusion holes communicating with the gas withdrawal hollow bore.

12. The nano-powder extraction apparatus as set forth in claim 4, further comprising:
- a gas withdrawal device installed to the rotatable drive shaft,
- the gas withdrawal device having:
- a gas withdrawal hollow bore extending vertically in the rotatable drive shaft from its middle portion to its upper portion, and being formed with a withdrawal opening at its upper end; and
- a withdrawal impeller horizontally mounted around the rotatable drive shaft at the lower end of the gas withdrawal hollow bore, and being formed with a plurality of hollow diffusion holes communicating with the gas withdrawal hollow bore.

* * * * *